United States Patent
Nakabayashi

(10) Patent No.: US 7,951,866 B2
(45) Date of Patent: May 31, 2011

(54) TRANSPARENT RESIN MOLDING, OPTICAL LENS, AND OPTICAL FILM

(75) Inventor: Makoto Nakabayashi, Sennan-gun (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 53 days.

(21) Appl. No.: 12/442,037

(22) PCT Filed: Oct. 1, 2007

(86) PCT No.: PCT/JP2007/069218
§ 371 (c)(1),
(2), (4) Date: Mar. 19, 2009

(87) PCT Pub. No.: WO2008/041680
PCT Pub. Date: Apr. 10, 2008

(65) Prior Publication Data
US 2010/0048805 A1    Feb. 25, 2010

(30) Foreign Application Priority Data

Oct. 2, 2006  (JP) .................................. 2006-271121

(51) Int. Cl.
*B60C 1/00* (2006.01)
*C08K 3/02* (2006.01)
*C08G 69/26* (2006.01)
*C08G 63/91* (2006.01)
*C08L 77/00* (2006.01)
*C08F 8/00* (2006.01)
*C08F 283/00* (2006.01)

(52) U.S. Cl. ....... 524/570; 524/80; 524/606; 525/326.1; 525/418

(58) Field of Classification Search .................... 524/80, 524/570, 606; 525/418, 326.1
See application file for complete search history.

(56) References Cited

U.S. PATENT DOCUMENTS

| | | | |
|---|---|---|---|
| 5,187,012 A | 2/1993 | Takahashi et al. | |
| 5,366,812 A | 11/1994 | Takahashi et al. | |
| 6,271,312 B1 * | 8/2001 | Koike et al. | ................... 525/199 |
| 2004/0126592 A1 * | 7/2004 | Shibahara et al. | ............ 428/441 |
| 2005/0242466 A1 | 11/2005 | Kanazawa et al. | |
| 2008/0224159 A1 | 9/2008 | Krauter et al. | |

FOREIGN PATENT DOCUMENTS

| | | |
|---|---|---|
| CN | 1690105 A | 11/2005 |
| JP | 03-223328 | 10/1991 |
| JP | 2004-237649 | 8/2004 |
| WO | WO 2006/040954 A1 | 4/2006 |
| WO | WO 2006/114082 A2 | 11/2006 |

OTHER PUBLICATIONS

Ide, Fumio, :Latest Transparent Resin, Kogyo Chosakai Publishing Inc., 2001, p. 48 with Partial English Translation, <http://www.iijnet.or.jp/kocho/>.
Chinese Office Action, with English translation, issued in Chinese Patent Application No. 200780037050.5, mailed Jan. 26, 2011.

* cited by examiner

*Primary Examiner* — Timothy J. Kugel
*Assistant Examiner* — Atnaf Admasu
(74) *Attorney, Agent, or Firm* — McDermott Will & Emery LLP

(57) ABSTRACT

It is an object of the present invention to provide a transparent resin molding having both high reflow heat resistance and excellent optical characteristics and to provide an optical lens and an optical film each including the transparent resin molding and having high heat resistance and excellent optical characteristics. A transparent resin molding according to the present invention is obtained by molding a molding material containing a thermoplastic resin and crosslinking the thermoplastic resin, in which the thermoplastic resin is selected from resins having an average transmissivity of 60% or more in the wavelength range of 600 to 1,000 nm when molded into a molding with a thickness of 2 mm, and the resin molding with a thickness of 2 mm has an average transmissivity of 60% or more in the wavelength range of 600 to 1,000 nm when the resin molding is heated at 200° C. for 10 minutes.

6 Claims, 1 Drawing Sheet

TRANSPARENT RESIN MOLDING, OPTICAL LENS, AND OPTICAL FILM

RELATED APPLICATIONS

This application is the U.S. National Phase under 35 U.S.C. §371 of International Application No. PCT/JP2007/069218, filed on Oct. 1, 2007, which in turn claims the benefit of Japanese Application No. 2006-271121, filed on Oct. 2, 2006, the disclosures of which Applications are incorporated by reference herein.

TECHNICAL FIELD

The present invention relates to a transparent resin molding used for forming an optical lens or an optical film to be mounted into an electronic device, and an optical lens and an optical film each including the transparent resin molding.

BACKGROUND ART

In recent years, in order to cope with miniaturization and enhancement of performance of various electronic devices, the size of electronic components to be mounted has been increasingly reduced. Accordingly, as the method of mounting electronic components onto a circuit substrate, solder reflow, which is a process capable of obtaining a high mounting density and high manufacturing efficiency, has been commonly used. Furthermore, in recent years, since use of Pb-free solder having high melting point has been desired in view of environmental problems, in the solder reflow process, heating has been performed at a high temperature of 220° C. to 270° C. Consequently, the electronic components have also been desired to have heat resistance that can withstand such a high temperature.

Examples of the electronic components include components into which members requiring transparency, such as optical lenses and transparent films, are built. In the past, as such members requiring transparency, moldings of inorganic glass and transparent thermoplastic resins have been used (Non-Patent Document 1).

Non-Patent Document 1: Kokomadekita tomei-jushi (Transparent resin update), Kogyo Chosakai Publishing, Inc., 2001, p. 48

DISCLOSURE OF INVENTION

Problems to be Solved by the Invention

However, inorganic glass has drawbacks: namely, it has high specific gravity, is brittle, and thus, is easily broken, and failure surfaces have acute angles. Furthermore, molding of inorganic glass takes time, which is a problem. Meanwhile, thermoplastic resins, such as polymethyl methacrylate, polycarbonate, and polyethylene terephthalate, are lightweight and excellent in mechanical characteristics and workability. However, thermoplastic resins are inferior to glass in terms of heat resistance and optical characteristics (e.g., transparency and susceptibility to discoloration), which is a problem. Therefore, in use of such thermoplastic resins, resin moldings having sufficient heat resistance that can withstand high temperatures in the solder reflow process using Pb-free solder (hereinafter referred to as "reflow heat resistance") have not been obtained.

As the resin that has higher heat resistance than the resins described above, polysulfone, polyether sulfone, polyimide, polyetherimide, etc., may be exemplified. However, resin moldings obtained using such resins have low transparency in the visual light range (380 to 740 nm) and high birefringence because the resins contain benzene rings, which are problems.

It is an object of the present invention to provide a transparent resin molding having both high reflow heat resistance and excellent optical characteristics. The present invention also provides an optical lens and an optical film each including the transparent resin molding and having high heat resistance and excellent optical characteristics.

Means for Solving the Problems

As a result of diligent research, the present inventor has found that the object described above can be achieved by a resin molding obtained by using, as a starting material, a molding material containing a crosslinkable thermoplastic resin having high transmissivity in the visible to near-infrared range, and crosslinking the thermoplastic resin, in which high transmissivity is exhibited in the visible to near-infrared range, and thus the present invention has been completed.

That is, a first aspect of the invention of the present application provides a transparent resin molding obtained by molding a molding material containing a thermoplastic resin and crosslinking the thermoplastic resin, in which the thermoplastic resin is selected from resins having an average transmissivity of 60% or more in the wavelength range of 600 to 1,000 nm when molded into a molding with a thickness of 2 mm, and the resin molding with a thickness of 2 mm has an average transmissivity of 60% or more in the wavelength range of 600 to 1,000 nm when the resin molding is heated at 200° C. for 10 minutes.

Here, the thermoplastic resin is to be crosslinked, and thus is a crosslinkable thermoplastic resin. The term "crosslinkable thermoplastic resin" refers to a thermoplastic resin having a portion (crosslink site) capable of forming a crosslink in the main chain or the side chain thereof, namely, a thermoplastic resin capable of causing crosslinking reaction by heating, ionizing irradiation, UV irradiation, or the like.

By molding the molding material containing the crosslinkable thermoplastic resin, followed by heating, radiation irradiation, or the like, a crosslinked molding can be obtained. The molding method is not particularly limited, and a known molding method can be employed. Examples thereof include an injection molding process, an injection compression molding method, a press molding method, an extruding molding method, a blow molding method, and a vacuum molding method. When the molding material is molded into a film shape, an extruding molding method using a T-shaped die, a calendering molding method, inflation molding, pressing, casting, thermoforming, or the like can also be employed.

The molding obtained by crosslinking is excellent in heat resistance and rigidity, and has good creep resistance and abrasion resistance. In the stage before crosslinking is performed, molding can be easily performed. Consequently, molding is performed in a predetermined manner in this stage, and crosslinking is performed by heating, radiation irradiation, or the like after molding. Thereby, it is possible to easily obtain a molding having excellent characteristics.

Examples of the crosslinking method include crosslinking by heating, and crosslinking by irradiation with electron beams or other radiation. In the crosslinking method using electron beams or other radiation, the temperature during molding and flowability are not limited, and controlling is easy, thus being preferable. As the radiation, in addition to electron beams, γ-ray or the like can be exemplified. The degree of crosslinking is not particularly limited, and may be set in accordance with the desired resin molding.

The resin molding of the present invention has an average transmissivity of 60% or more in the wavelength of 600 to 1,000 nm with a thickness of 2 mm when the resin molding is heated at 200° C. for 10 minutes. Heating at 200° C. for 10 minutes is set in consideration of reflow heat resistance. When the average transmissivity is less than 60%, transparency after solder reflow is low, which is a problem.

Furthermore, glass with a thickness of 2 mm has an average transmissivity of 80% or more in this range. Therefore, preferably, the resin molding has an average transmissivity of 80% or more in the wavelength range of 600 to 1,000 nm with a thickness of 2 mm when the resin molding is heated at 200° C. for 10 minutes.

Among the transparent resin moldings having the average transmissivity described above, a transparent resin molding with a thickness of 2 mm having a total light transmission of 60% or more when the transparent resin molding is heated at 200° C. for 10 minutes has high transparency in the visual light range, thus being preferable. The total light transmission is an index of transparency and is measured according to the measurement method of Japanese Industrial Standards (JIS) K 7361. The total light transmission is expressed in percentage of the ratio between the incident light amount $T_1$ and the total amount $T_2$ of light passed through a specimen.

On the other hand, in a transparent resin molding having an average transmissivity of 60% or more in the wavelength range of 700 to 1,100 nm with a thickness of 2 mm when the transparent resin molding is heated at 200° C. for 10 minutes, transparency in the near-infrared range is high. Thus, such a transparent resin molding is preferably used in the near-infrared range.

The transparent resin molding of the present invention preferably has a storage elastic modulus of 0.1 MPa or more at 270° C. (a second aspect of invention of the present application). By setting the storage elastic modulus at 270° C. to be 0.1 MPa or more, it is possible to obtain satisfactory rigidity from room temperature to high temperatures exceeding the reflow temperature. Consequently, even during reflow heating, thermal deformation does not easily occur. More preferably, the storage elastic modulus at 270° C. is 1 MPa or more. Thereby, occurrence of thermal deformation can be further prevented, and a more excellent molding can be obtained.

Here, the storage elastic modulus is a term (real term) in the complex elastic modulus representing the relationship between stress and strain when sinusoidally-varied vibrational strain is applied to a viscoelastic body, and is a value measured by a viscoelasticity measuring instrument (DMS). More specifically, the storage elastic modulus is a value measured by a viscoelasticity measuring instrument, i.e., DVA-200 manufactured by IT Keisoku Seigyo, Co. Ltd., at a rate of temperature increase of 10° C./min.

As described above, the transparent resin molding of the present invention is obtained using a crosslinkable thermoplastic resin. The thermoplastic resin is selected from resins having an average transmissivity of 60% or more in the wavelength range of 600 to 1,000 nm when the resin is molded into a molding with a thickness of 2 mm. Here, the resin is primarily composed of a polymer, but may contain an oligomer or a monomer. Preferably, the resin has a weight-average molecular weight of 5,000 or more. By using the thermoplastic resin, it is possible to obtain a transparent resin molding with a thickness of 2 mm having an average transmissivity of 60% or more in the wavelength range of 600 to 1,000 nm when the resin molding is heated at 200° C. for 10 minutes.

Specifically, as the thermoplastic resin, one or two or more resins selected from the group consisting of clear polyamides, cyclic polyolefins, polystyrenes, fluorine resins, polyesters, acrylic resins, polycarbonates, and ionomer resins are preferably exemplified (a third aspect of invention of the present application).

In particular, the thermoplastic resin preferably includes a monomer composed of only chemical bonds having a polarizability of $0.6 \times 10^{-23}$ or less (a fourth aspect of invention of the present application). When the polarizability differs depending on the direction with respect to the chemical bonds, preferably, the monomer is composed of only chemical bonds having a polarizability of $0.6 \times 10^{-23}$ or less in all of the different directions. If the constituent monomer of the thermoplastic resin includes a monomer containing chemical bonds having a polarizability exceeding $0.6 \times 10^{-23}$, the photoelastic constant increases, and birefringence due to molding and stress increases, easily resulting in problems, such as a difficulty in obtaining a clear image.

Clear polyamides are disclosed in Japanese Unexamined Patent Application Publication Nos. 62-121726, 63-170418, and 2004-256812, etc. These clear polyamides are obtained using monomers having a ring, such as an aromatic ring or an alicycle. They are amorphous bodies and polyamides having a high glass transition point.

Clear polyamides can be obtained, for example, by condensation of a diamine and a dicarboxylic acid. Examples of the diamine that can be used in this case include branched or straight-chain aliphatic diamines having 6 to 14 carbon atoms, such as 1,6-hexamethylenediamine, 2-methyl-1,5-diaminopentane, 2,2,4-trimethylhexamethylene diamine, 2,4,4-trimethylhexamethylenediamine, 1,9-nonanemethylene diamine, 1,10-decamethylene diamine, and 1,12-decamethylene diamine; alicyclic diamines having 6 to 22 carbon atoms, such as 4,4'-diaminodicyclohexylmethane, 3,3'-dimethyl-4,4'-diaminodicyclohexylmethane, 4,4'-diaminodicyclohexylpropane, 1,4-diaminocyclohexane, 1,4-bis(aminomethyl)-cyclohexane, 2,6-bis(aminomethyl)-norbornane, and 3-aminomethyl-3,5,5-trimethylcyclohexylamine; and aromati/aliphatic diamines having 8 to 22 carbon atoms, such as m-xylylenediamine, p-xylylenediamine, and bis(4-aminophenyl)propane.

Examples of the dicarboxylic acid include branched or straight aliphatic dicarboxylic acids having 6 to 22 carbon atoms, such as adipic acid, 2,2,4-trimethyl adipic acid, 2,4,4-trimethyl adipic acid, azelaic acid, sebacylic acid, and 1,12-dodecanedioic acid; alicyclic dicarboxylic acids having 6 to 22 carbon atoms, such as cyclohexane-1,4-dicarboxylic acid, 4,4'-dicarboxyldicyclohexylmethane, 3,3'-dimethyl-4,4'-dicarboxyldicyclohexylmethane, 4,4'-dicarboxyldicyclohexylpropane, and 1,4-bis(carboxymethyl)cyclohexane; aromati/aliphatic dicarboxylic acids having 8 to 22 carbon atoms, such as 4,4'-diphenylmethane dicarboxylic acid; and aromatic dicarboxylic acids having 8 to 22 carbon atoms, such as isophthalic acid, tributylisophthalic acid, terephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, and diphenyl ether-4,4'-dicarboxylic acid.

Clear polyamides can also be obtained by ring opening polymerization of a lactam, condensation of ω-aminocarboxylic acid, or the like. As the starting material monomer used in this case, a lactam having 6 to 12 carbon atoms or corresponding ω-aminocarboxylic acid, ε-caprolactam, ε-aminocaproic acid, capryl-lactam, ω-aminocaprylic acid, ω-aminoundecanoic acid, laurinlactam, or ω-aminododecanoic acid can be exemplified.

More specific examples of the clear polyamide that can be used in the present invention include a polyamide composed of terephthalic acid and an isomer mixture of 2,2,4-trimethylhexamethylenediamine and 2,4,4-trimethylhexamethylenediamine; a polyamide composed of isophthalic acid and 1,6-hexamethylenediamine; a copolyamide composed of terephthalic acid/isophthalic acid and 1,6-hexamethylenediamine; a copolyamide composed of isophthalic acid, 3,3'-dimethyl-4,4'-diaminodicyclohexylmethane, and laurinlactam or caprolactam; a (co)polyamide composed of 1,12-dodecanedioic acid or 1,10-dodecanedioic acid, 3,3'-dimethyl-4,4'-diaminodicyclohexylmethane, and, depending on the case, laurinlactam or caprolactam; a copolyamide composed of isophthalic acid, 4,4'-diaminodicyclohexylmethane, and laurinlactam or caprolactam; a polyamide composed of 1,12-dodecanedioic acid and 4,4'-diaminodicyclohexylmethane; and a copolyamide composed of a terephthalic acid/isophthalic acid mixture, 3,3'-dimethyl-4,4'-diaminodicyclohexylmethane, and laurinlactam.

Furthermore, the clear polyamide may be a compound of many different polyamides within the scope of the present invention. As long as the compound itself is transparent, the compound may contain a crystalline component. Specific examples of commercial products of the clear polyamide include transparent nylon 12 (trade name: Grilamid TR-55 and TR-90 (manufactured by EMS-chemie Japan Ltd)). These clear polyamides have excellent UV resistance, and discoloration, deformation, etc. do not easily occur under exposure to UV from xenon emission or the like.

Cyclic polyolefins are polyolefin resins that can be obtained by polymerization of monomers including cyclic olefin monomers. The cyclic olefin monomers are commonly known as disclosed in Japanese Unexamined Patent Application Publication No. 8-20692, etc. For example, cyclopentene, 2-norbornene, and tetracyclododecene compounds are preferably used.

Specific examples thereof include 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, dicyclopentadiene, 2,3-dihydrodicyclopentadiene, tetracyclo-3-dodecene, 8-methyltetracyclo-3-dodecene, 8-ethyltetracyclo-3-dodecene, 8-hexyltetracyclo-3-dodecene, 2,10-dimethyltetracyclo-3-dodecene, 5,10-dimethyltetracyclo-3-dodecene, 1,4:5,8-dimethano-1,2,3,4,4a,5,8,8a-2,3-cyclopentadienonaphthalene, 6-ethyl-1,4:5,8-dimethano-1,4,4a,5,6,7,8,8a-octahydronaphthalene, and 1, 4:5, 10:6,9-trimethano-1,2,3,4,4a,5,5a,6,9,9a,10,10a-dodecahydro-2,3-cyclopentadienoanthracene. Further examples include addition products of cyclopentadiene and tetrahydroindene, etc., and their derivatives or substitution products as described above.

Cyclic polyolefin resins can be obtained by polymerization of monomers including the cyclic olefin monomers described above. Monomers to be subjected to polymerization reaction may include a monomer other than the cyclic olefin monomers described above. As the monomer other than the cyclic olefin monomer, a monomer having an unsaturated group copolymerizable with the cyclic olefin monomer is used. Specific examples thereof include α-olefins, such as ethylene, propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene, 1-hexadecene, and 1-icosene; unsaturated carboxylic acids, such as acrylic acid, methacrylic acid, maleic acid, fumaric acid, itaconic acid, citraconic acid, tetrahydrophthalic acid, and methyltetrahydrophthalic acid; acrylate esters and methacrylate esters, such as methyl acrylate, ethyl acrylate, hydroxyethyl acrylate, methyl methacrylate, ethyl methacrylate, and hydroxyethyl methacrylate; unsaturated dicarboxylate diesters, such as dimethyl maleate, dimethyl fumarate, diethyl itaconate, and dimethyl citraconic acid; unsaturated carboxylic anhydrides, such as maleic anhydride, itaconic anhydrid, citraconic anhydrid, tetrahydrophthalic anhydride, and methyltetrahydrophthalic anhydride; vinyl alcohols and vinyl esters, such as vinyl alcohol and vinyl acetate; and styrenes, such as styrene and α-methylstyrene.

More specifically, cyclic polyolefin resins can be produced, for example, by a method in which the cyclic olefin monomer and the other monomer are subjected to random addition copolymerization, or a method in which the cyclic olefin monomer and the other monomer are subjected to ring opening polymerization, and the polymer produced by ring opening polymerization is hydrogenated. With respect to conditions for polymerization, such as a catalyst and a solvent to be used, and reaction temperature, known conditions described in Japanese Unexamined Patent Application Publication No. 8-20692 etc. can be employed.

Examples of the polyolefin resin thus obtained include a resin represented by structural formula (1) or (2) described below.

[Chemical formula 1]

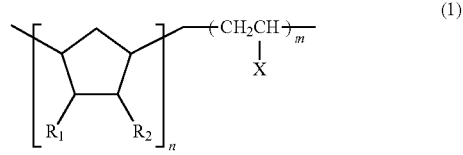

(1)

In the formula, $R_1$, $R_2$, and X, which may be the same or different, each represent a hydrogen atom, a hydrocarbon group, or a hydrocarbon group substituted by polar group, such as a halogen, a hydroxyl group, an ester group, an alkoxy group, a cyano group, an amide group, an imide group, or a silyl group.

[Chemical formula 2]

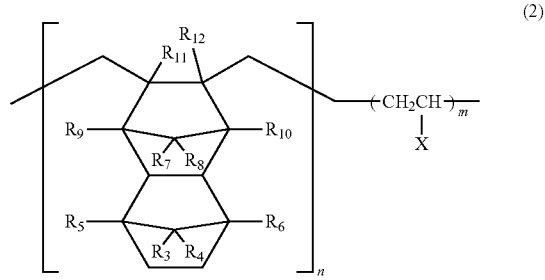

(2)

In the formula, $R_3$ to $R_{12}$ each represent a hydrogen atom or a hydrocarbon group; and X represents a hydrogen atom, a hydrocarbon group, or a hydrocarbon group substituted by polar group, such as a halogen, a hydroxyl group, an ester group, an alkoxy group, a cyano group, an amide group, an imide group, or a silyl group. Specific examples of commercial products of the cyclic olefin include APEL 6013T (manufactured by Mitsui Chemicals, Inc).

As the polystyrene, a polystyrene having any one of the atactic, isotactic, and syndiotactic configurations can be used. In view of crosslinkability, a polystyrene having the syndiotactic configuration is preferable because of its high crosslinkability.

Examples of the fluorine resin include fluorinated polyimide, fluorinated acrylate, fluorinated vinylidene, and ethylene-tetrafluoroethylene copolymer (ETFE).

Examples of the ionomer resin include olefin ionomers (e.g., "HIMILAN" trade name; manufactured by DuPont-Mitsui Polychemicals Co., Ltd. and "Surlyn" trade name; manufactured by E. I. du Pont de Nemours and Company) and fluorine-based ionomers (e.g., ETFE ionomer manufactured by Daikin Industries, Ltd).

When clear polyamides are crosslinked, water absorption power decreases. Furthermore, since ionomers and polyamides have polarity, adhesion strength of plating and vapor deposition can be enhanced. Consequently, they are suitable for use in reflectors, photoelectric conversion components, etc., and in forming circuits in lens components.

The transparent resin molding of the present invention preferably contains a filler as a reinforcing member (a fifth aspect of invention of the present application). When the filler is incorporated, the thermal dose (heating temperature, time) or the radiation irradiation dose required for setting the storage elastic modulus at 270° C. to be 0.1 MPa or more can be decreased, and also moldability and heat resistance are improved.

As the filler, it is desirable to use a so-called transparent filler, the refractive index of which is close to that of the resin, so as not to impair the transparency of the molding. As one example of the transparent filler, transparent glass fibers may be mentioned. The amount of the filler to be added is preferably 0.1 to 50 parts by weight, more preferably 1 to 50 parts by weight, on the basis of 100 parts by weight of the resin. Furthermore, a filler having a particle size smaller than the wavelength of light, fumed silica, a nano metal filler, or a nano composite filler can also be used. Examples of an organic filler include bio nano fibers (Kyoto University).

When the content of the filler is less than 0.1 parts by weight, it is necessary to increase the thermal dose or the irradiation dose of electron beam, or the like. As a result, problems, such as coloring of the molding, easily occur, and the molding tends to become brittle. When the content of the filler exceeds 50 parts by weight, the resulting molding tends to become brittle.

The transparent resin molding of the present invention may further contain cross-linking auxiliaries. By performing crosslinking using the cross-linking auxiliaries in combination, crosslinking is accelerated and excellent heat resistance and rigidity can be obtained, which is preferable.

Examples of the cross-linking auxiliaries include oximes, such as p-quinone dioxime and p,p'-dibenzoylquinone dioxime; acrylates and methacrylates, such as ethylene dimethacrylate, polyethylene glycol dimethacrylate, trimethylolpropane trimethacrylate, cyclohexyl methacrylate, acrylic acid/zinc oxide mixtures, and allyl methacrylate; vinyl monomers, such as divinylbenzene, vinyltoluene, and vinylpyridine; allyl compounds, such as hexamethylene diallyl-nadi-imide, diallyl itaconate, diallyl phthalate, diallyl isophthalate, diallyl monoglycidyl isocyanurate, triallyl cyanurate, and triallyl isocyanurate; and maleimide compounds, such as N,N'-m-phenylene bismaleimide and N,N'-(4,4'-methylenediphenylene)dimaleimide. These cross-linking auxiliaries may be used alone or in combination. In order to accelerate crosslinking and achieve excellent heat resistance and rigidity, besides use of cross-linking auxiliaries, introduction of a double bond into the main chain of the thermoplastic resin, introduction of a reactive substituent, or the like may be performed.

Other components can be added to the transparent resin molding of the present invention to an extent that does not deviate from the purpose of the present invention. Examples of the other components include an oxidant inhibitor, an ultraviolet ray absorber, a weatherability stabilizer, a copper inhibitor, a flame retardant, a lubricant, a conductant agent, and a plating agent.

The transparent resin molding of the present invention is excellent in heat resistance and optical characteristics, and thus is suitable for use as various optical materials, such as optical disks, optical lenses, optical films, prisms, optical diffuser plates, optical cards, optical fibers, optical mirrors, liquid crystal display substrates, and light guide plates. In particular, the transparent resin molding is suitable for use as an optical lens, such as an F-Theta Lens for laser-beam printer, a camera lens, a video camera lens, a finder lens, a pickup lens, a collimate lens, a projector lens for projection television, a projection lens for OHP projection panel, a Fresnel lens for stroboscope, a lens or a potting for light emitting diode (LED), or a lens for infrared communication (a sixth aspect of invention of the present application), or an optical film, such as a polarizing film, a phase difference film, an optical diffuser sheet, a prism sheet, a light-collecting sheet, or a lenticular lens (a seventh aspect of invention of the present application).

Advantages

The transparent resin molding of the present invention has excellent heat resistance that can withstand the solder reflow process using Pb-free solder and vapor deposition of indium tin oxide (ITO) and high transparency, and thus is suitable for use as a material for a member which is built in an electronic component and which requires transparency. In particular, the transparent resin molding can be suitably used as an optical material constituting an optical lens or an optical film and as electronic paper and a flexible display.

BEST MODES FOR CARRYING OUT THE INVENTION

Best modes for carrying out the present invention will now be described on the basis of Examples. It is to be understood that the present invention is not limited to Examples described herein, and various changes and modifications may be made without deviating from the purpose of the invention.

EXAMPLES

Examples 1 to 8 and Comparative Examples 1 and 2

The followings were used as crosslinkable thermoplastic resins:
a. Clear polyamide resin a-1. Grilamid TR-90 (manufactured by EMS-chemie Japan Ltd.): Tg=155° C., average transmissivity at wavelength of 600 to 1,000 nm (thickness 2 mm) 91% a-2. Grilamid TR-55 (manufactured by EMS-chemie Japan Ltd.): Tg=160° C., average transmissivity at wavelength of 600 to 1,000 nm (thickness 2 mm) 91% b. Cyclic polyolefinresin b-1. APEL 6013T (manufactured by Mitsui Chemicals, Inc.): Tg=145° C., average transmissivity at wavelength of 600 to 1,000 nm (thickness 2 mm) 90%

The following components were added to each of the crosslinkable thermoplastic resins described above, at the compounding ratios (in parts by weight) shown in Table, and plates (samples) with the size of 5 cm×7 cm×2 mm thick were formed by injection molding.

Glass fibers (trade name: ECS03T-287/PL, manufactured by Nippon Electric Glass Co., Ltd.)

Crosslinking Auxiliaries c. DA-MGIC: diallyl monoglycidyl isocyanurate (manufactured by Shikoku Chemicals Corporation)

d. TDI500: trimethylolpropane triacrylate (manufactured by DIC Corporation)

e. TAIC: triallyl isocyanurate (manufactured by Nippon Kasei Chemical Co., Ltd.)

After molding was performed, each of the samples was irradiated with an electron beam at the dose shown in Table to perform crosslinking. Then, with respect to each of the samples, reflow heat resistance, transmission property (transmissivity), total light transmission, and storage elastic modulus (270° C.) were measured by the methods described below. The results thereof are also shown in Table.

[Measurement Methods]

Reflow Heat Resistance:

The sample was left to stand in a thermostat bath at 260° C. for one minute, and the occurrence of deformation was checked. Evaluation was made on the basis of the criteria described below, and the results are shown in Table.

○: Not deformed.

Δ: Although deformed, shape was maintained.

x: Completely melted.

Figure 1:
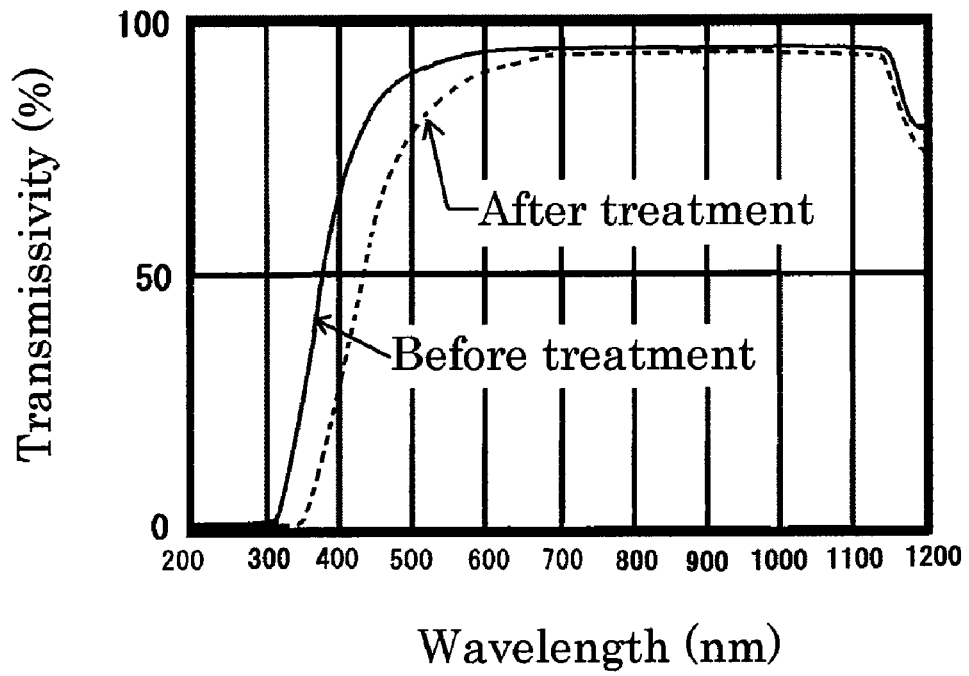
FIG. 1 is a graph showing the relationship between wavelength and transmissivity with respect to a sample of Example 1.
Figure 2:
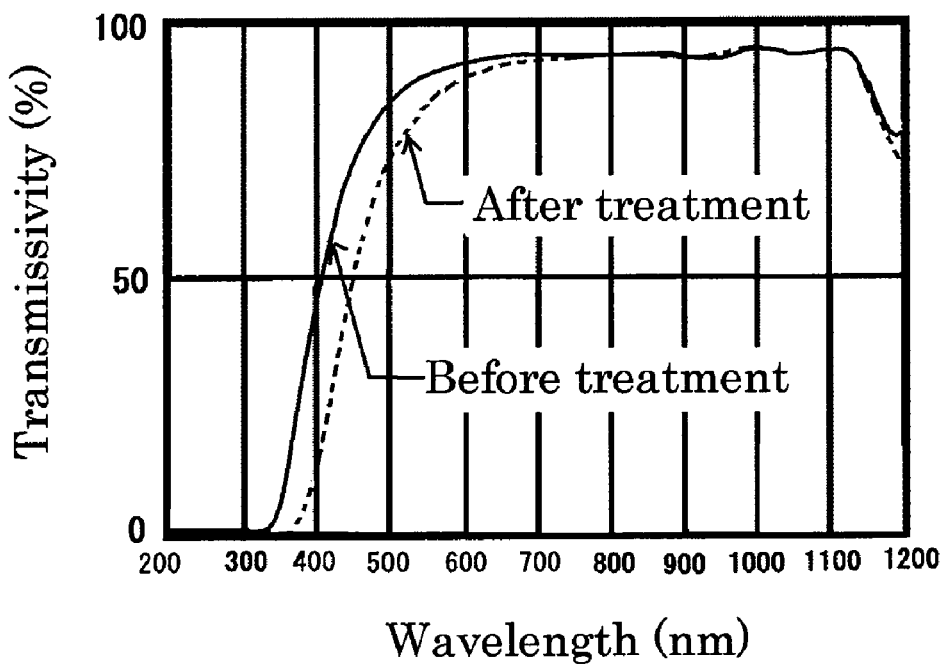
FIG. 2 is a graph showing the relationship between wavelength and transmissivity with respect to a sample of Example 7.

Transmission Property (Transmissivity):

Each of the samples of Examples 1 and 7, in which a clear polyamide resin (Grilamid TR-90) was used as the thermoplastic resin, and TAIC was incorporated as cross-linking auxiliaries, was left to stand in an atmosphere at 150° C. for 4 hours, left to stand in an atmosphere at 30° C. and a humidity of 70% for 72 hours, and dipped in a solder bath at 260° C. for one minute. Then, transmissivity in the wavelength range of 300 to 1,200 nm was measured. The results thereof are shown in FIG. 1 (Example 1) and FIG. 2 (Example 7) (shown as after heat treatment in the figures). With respect to the samples before treatment, transmissivity was measured in the same manner, and the results thereof are also shown in FIG. 1 (Example 1) and FIG. 2 (Example 7) (shown as before heat treatment in the figures).

Total Light Transmission:

With respect to the sample after heating at 200° C. for 10 minutes (thickness 2 mm), the ratio between the incident light amount $T_1$ and the total amount $T_2$ of light passed through a specimen in the visible light range is expressed in percentage in accordance with JIS K 7361.

Storage Elastic Modulus:

With respect to the sample after heating at 200° C. for 10 minutes, a storage elastic modulus at 270° C. was measured by a viscoelasticity measuring instrument, i.e., DVA-200 manufactured by IT Keisoku Seigyo, Co. Ltd., at a rate of temperature increase of 10° C./min.

TABLE

|  |  | Example |  |  |  |  |  |  |  | Comparative example |  |
|---|---|---|---|---|---|---|---|---|---|---|---|
|  |  | 1 | 2 | 3 | 4 | 5 | 6 | 7 | 8 | 1 | 2 |
| Compounding formula | EMS TR90 | 97.5 |  |  |  |  |  | 90 |  | 100 |  |
|  | EMS TR55 |  | 100 | 100 | 100 |  |  |  |  |  |  |
|  | APEL 6013T |  |  |  |  | 100 | 100 |  | 100 |  | 100 |
|  | GF |  |  |  |  |  | 26 |  | 25 |  |  |
|  | DA-MGIC |  |  |  | 2 |  |  |  |  |  |  |
|  | TD1500 |  |  | 2 |  |  |  |  |  |  |  |
|  | TAIC | 2.5 | 2 |  |  | 2 | 2 | 10 |  |  |  |
|  | (Total) | 100 | 102 | 102 | 102 | 102 | 126 | 100 | 125 | 100 | 100 |
| Electron beam irradiation dose (kGy) |  | 480 | 480 | 480 | 480 | 480 | 480 | 480 | 480 | 0 | 0 |
| Heat resistance during reflow soldering |  | ○ | ○ | Δ | ○ | Δ | ○ | ○ | Δ | X | X |
| Total light transmission (%) |  | 85 | 83 | 80 | 75 | 80 | 65 | 80 | 70 | 90 | 89 |
| Storage elastic modulus (MPa) |  | 5 | 4 | 1 | 2 | 1 | 3 | 7 | 0.07 | Unmeasurable |  |

With respect to Comparative Examples 1 and 2, in which crosslinking auxiliaries were not incorporated and electron beam irradiation was not performed, the samples melted at 260° C. because crosslinking was not performed, indicating poor reflow heat resistance. In contrast, as is evident from the results in Table, with respect to Examples 1 to 8, in which crosslinking was performed by electron beam irradiation, reflow heat resistance is excellent. Furthermore, as is evident from comparison between Examples 5 and 6, incorporation of the organic filler improves reflow heat resistance.

As shown in Table, in the moldings of Examples 1 and 7, the total light transmission is about 80% or more, indicating excellent transparency comparable to inorganic glass. Furthermore, the following is evident from FIGS. 1 and 2:

(1) Transmissivity exceeds 60% in the wavelength range longer than about 450 nm with respect to the sample of Example 1 and in the wavelength range longer than about 470 nm with respect to the sample of Example 7, and also with respect to the samples after heat treatment. Thus, high transmissivity is obtained over the substantially entire visible range.

(2) In particular, with respect to each sample after heat treatment, transmissivity exceeds 85% in the wavelength range longer than about 600 nm and in the wavelength range shorter than about 1,000 nm. Thus, high transmissivity comparable to inorganic glass is obtained.

(3) In each sample, in the wavelength range longer than about 700 nm, there is substantially no difference in transmissivity before and after heat treatment, and in this range, particularly high reflow heat resistance is obtained.

In Examples 1 to 7, in which crosslinking was performed using the cross-linking auxiliaries, the storage elastic modulus at 270° C. after heating at 200° C. for 10 minutes is 1 MPa or more. Thus, excellent moldings are obtained in which thermal deformation does not occur. In Example 8, in which crosslinking was performed by electron beam irradiation, but crosslinking auxiliaries were not incorporated, the storage elastic modulus at 270° C. is less than 0.1 MPa. Meanwhile, in Comparative Examples 1 and 2, in which crosslinking was not performed, the samples melted at 260° C. in one minute, and it was not possible to measure a storage elastic modulus at 270° C.

Example 9

A Fresnel lens with the size of 15 mm×7 mm×2 mm thick was formed by injection molding using materials with the same compounding formula as that in Example 1. After injection molding was performed, crosslinking was performed by electron beam irradiation at a dose of 480 kGy. The sample irradiated with the electron beam was mounted with a mounter, and then reflow was performed at a peak temperature of 260° C. A light emission test was carried out using the resulting sample as a stroboscope of a digital camera and using xenon as a light source. It was confirmed that the sample functioned as the stroboscope.

The present invention has been described in detail with reference to the particular embodiments. However, it is apparent that a person skilled in the art can make modifications or alterations to the embodiments without departing from the spirit and the scope of the present invention.

This application is based on the Japanese Patent Application No. 2006-271121 filed on Oct. 2, 2006, the entire content of which is hereby incorporated by reference.

All the references cited herein are also entirely incorporated by reference.

The invention claimed is:

1. A transparent resin molding obtained by molding a molding material containing a thermoplastic resin and crosslinking the thermoplastic resin,
   wherein the thermoplastic resin is selected from resins having an average transmissivity of 60% or more in the wavelength range of 600 to 1,000 nm when molded into a molding with a thickness of 2 mm,
   the resin molding with a thickness of 2 mm has an average transmissivity of 60% or more in the wavelength range of 600 to 1,000 nm when the resin molding is heated at 200° C. for 10 minutes, and
   wherein the transparent resin molding has a storage elastic modulus of 0.1 MPa or more at 270° C.

2. The transparent resin molding according to claim 1, wherein the thermoplastic resin comprises one or more resins selected from the group consisting of clear polyamides, cyclic polyolefins, polystyrenes, fluorine resins, polyesters, acrylic resins, polycarbonates, and ionomer resins.

3. The transparent resin molding according to claim 1, wherein the thermoplastic resin includes a monomer composed of only chemical bonds having a polarizability of $0.6 \times 10^{-23}$ or less.

4. The transparent resin molding according to claim 1, further comprising a filler.

5. An optical lens comprising the transparent resin molding according to claim 1.

6. An optical film comprising the transparent resin molding according to claim 1.

* * * * *